April 14, 1959 A. U. BRYANT 2,882,009
VALVE CONSTRUCTION
Filed July 3, 1953 3 Sheets-Sheet 3
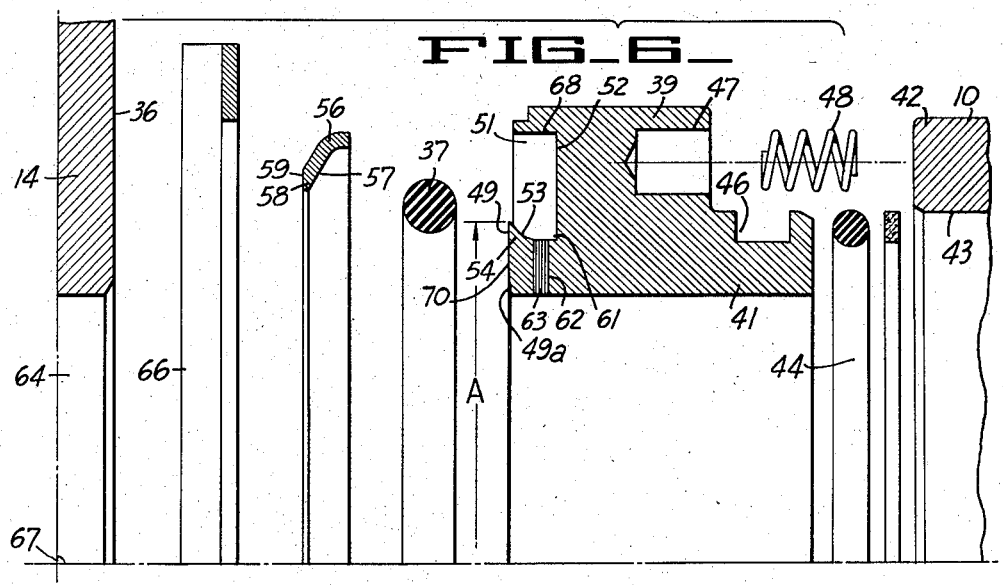
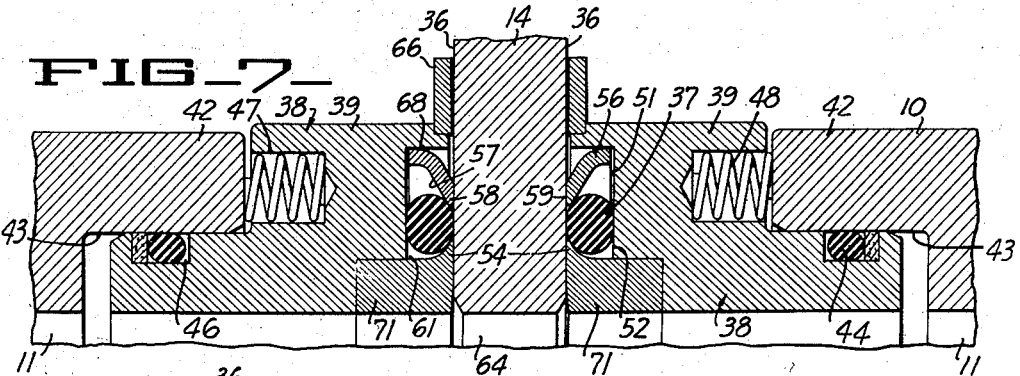
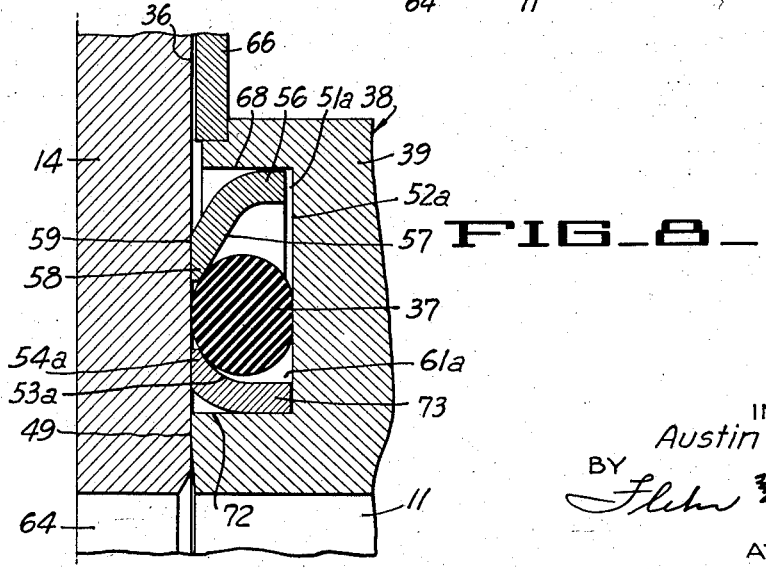
INVENTOR
Austin U. Bryant
BY
ATTORNEYS

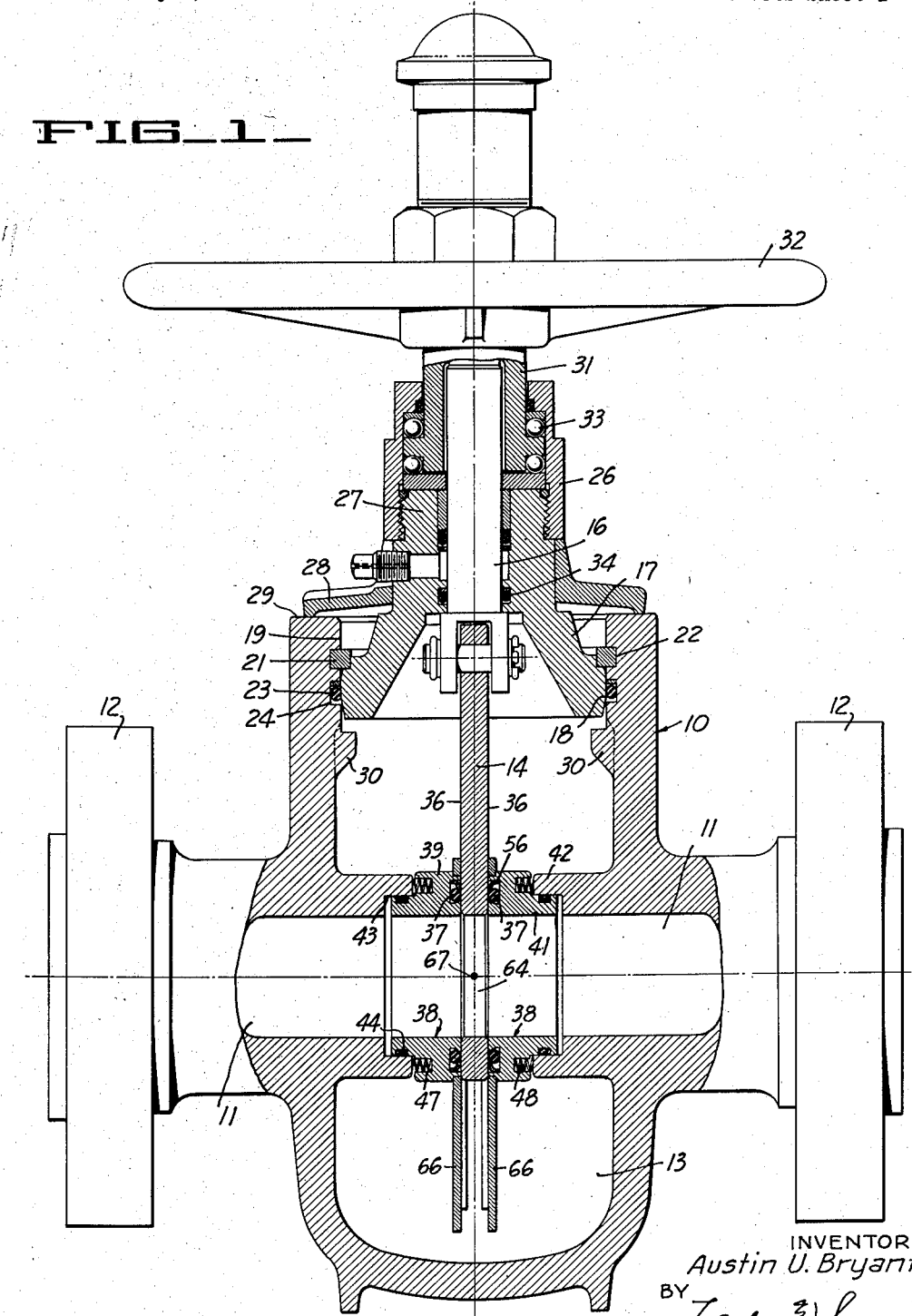

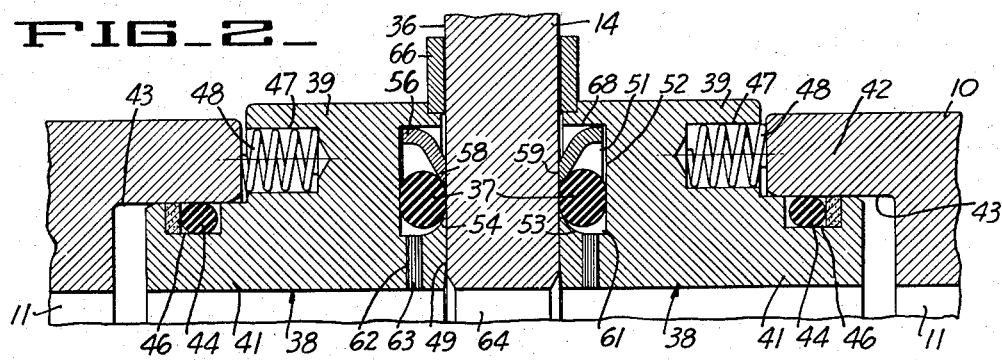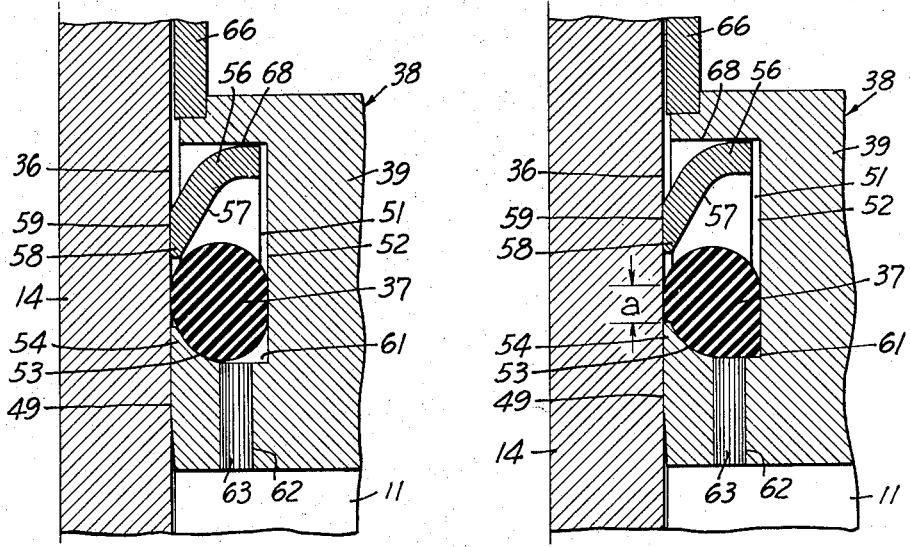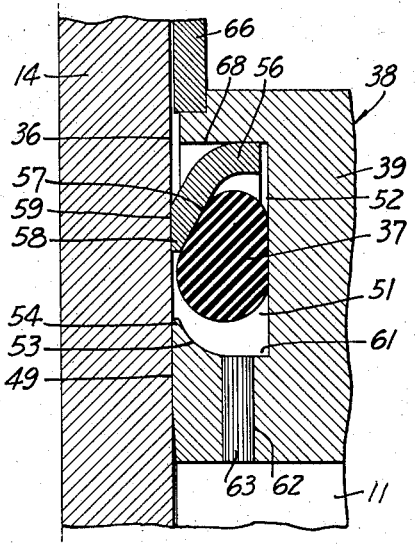

United States Patent Office 2,882,009
Patented Apr. 14, 1959

2,882,009

VALVE CONSTRUCTION

Austin U. Bryant, Walnut Creek, Calif., assignor, by mesne assignments, to Walworth Company, New York, N.Y., a corporation of Massachusetts Application July 3, 1953, Serial No. 365,801

7 Claims. (Cl. 251—172)

This invention relates generally to valves of the type used for controlling flow of various fluids, including gases and liquids, and particularly to valves making use of one or more resilient seal rings.

In my copending application, Serial No. 331,839 filed January 19, 1953, now abandoned (of which this application is a continuation in part), there is disclosed a valve making use of a seal ring of the O-ring type, and which provides bubble-tight shutoff for closed valve position. One embodiment described in that application utilizes a gate which is moved laterally of the flow passages between open and closed positions, and another embodiment employs a plug which is ported and which is turned between open and closed positions. In the preferred embodiments two seal rings are employed together with mounting means for the same, one on each side of the valve member. The arrangement is such that for closed position of the valve the seal is established upon the downstream side of the valve member. A seal upon the upstream side of the valve member is avoided by constructing the mounting means in such a fashion that when the upstream O-ring is urged outwardly by pressure applied to the inner side of the same, it is disengaged from sealing contact with the valve member.

It is an object of the present invention to improve in certain respects upon the invention disclosed in the above mentioned copending application, particularly with respect to the construction of the mounting means for the O-rings and the means for preventing the upstream seal ring from establishing a seal.

Another object of the invention is to provide a mounting means for a resilient seal ring of the O-ring type, which is applicable to retain the O-ring against dislodgement during the operation of the valve, and which at the same time will enable maintenance of a good fluid-tight seal over a wide range of operating pressures, without occasioning undue wear of the O-ring for movements of the valve member between open and closed positions with line pressure being applied.

Another object of the invention is to provide a gate valve of the high pressure type having an O-ring mounting means which provides a thrust receiving annular metal surface formed to prevent or minimize scoring.

Another object is to provide a valve of the above character which is self relieving with respect to body pressure.

Additional objects of the invention will appear from the following description in which the preferred embodiment has been set forth in detail in conjunction with the accompanying drawing.

Referring to the drawing:

Figure 1 is a side elevational view in section illustrating a valve of the gate type incorporating the present invention.

Figure 2 is an enlarged cross-sectional detail illustrating the resilient seal rings and the mounting means for the same.

Figures 3, 4 and 5 are details in section illustrating the position of the O-ring under different operating conditions.

Figure 6 is a detail in section illustrating the various parts of a mounting assembly in exploded form.

Figure 7 is a view like Figure 2 but illustrating another embodiment of the invention.

Figure 8 is an enlarged cross-sectional detail illustrating another embodiment of the invention.

The valve as illustrated in Figure 1 of the drawing consists of a body 10 provided with flow passages 11. Flanges 12 or other suitable means can be provided for coupling the body to associated piping. Within the body there is a closed space 13 which accommodates the valve gate 14. One end of the gate is attached to the stem or operating rod 16 which extends through the bonnet 17.

The bonnet assembly can be in accordance with that disclosed and claimed in my copending application, Serial No. 349,849, filed April 20, 1953. Briefly the bonnet 17 is machined to provide a convex peripheral surface 18, which is accommodated within the body bore 19. A segmented lock ring 21 is accommodated within the annular groove 22, and serves to lock the bonnet 17 in a normal operating position. A resilient seal ring 23 of the O-ring type is accommodated in the body recess 24, and forms a fluid-tight seal between the body and the bonnet. A sleeve 26 is threaded on the exterior portion 27 of the bonnet, and engages a flanged annular clamping member 28. The outer margin of this clamping member engages the end face 29 of the valve body, whereby when the sleeve 26 is tightened, clamping member 28 forces the bonnet into clamping engagement with the lock ring 21. By loosening the sleeve 26, the operator may drop the bonnet upon the body lugs 30, after which the sections of the lock ring 21 can be removed, and then the bonnet retracted from the body.

The valve rod 16 can be moved by suitable means such as the sleeve 31, which is attached to the hand wheel 32', and which has its upper portion threaded (not shown) to engage an upper threaded portion (not shown) of the rod 16. A suitable thrust bearing assembly 33 serves to journal the lower end of the sleeve 31 to the bonnet and the sleeve 26. Suitable means such as the seal rings 34 of the O-ring type, serve to seal against leakage about rod 16.

The smooth side surfaces 36 of the gate 14 are engaged by the resilient seal rings 37 of the O-ring type and these rings in turn are retained by the annular mounting assemblies 38. The arrangement is such that the seal rings together with the mounting assemblies establish a fluid-tight seal between the body and the gate.

As illustrated particularly in Figure 2, each of the mounting assemblies 38 consists of a metal mounting ring 39, which has a portion 41 of reduced exterior diameter. The adjacent annular portion 42 of the valve body is provided with a bore 43 in which the portion 41 is slidably fitted. Leakage between these parts is prevented by suitable means such as the resilient ring 44 of the O-ring type, which is accommodated in the annular groove 46.

Spring means is provided to urge the mounting ring 39 toward the gate. Thus the ring is shown with a plurality of circumferentially spaced openings 47, which accommodate the compression springs 48. Normally these springs serve to urge the seal rings into sealing contact with the gate surfaces 36, and with rings having a fair degree of give (e.g. rings made of synthetic rubber) the thrust of the springs serves to compress the O-rings and cause direct contact between metal surfaces 49 and the gate.

Each of the resilient O-rings 37 is accommodated in an annular recess 51, which is formed in the corresponding end of the mounting ring 39. The recess is defined by a bottom surface 52, which extends substantially parallel to the corresponding gate surface 36, and a surface 53 which extends about the inner side of the O-ring, and which has a curved portion to form the retaining lip 54.

A separate rigid ring 56 extends about each O-ring, and serves in effect to define the outer side of the O-ring retaining recess. Each of these members can be formed of suitable pressed sheet metal, and it is dished to provide an inner surface 57 which is inclined at an angle of the order of 30 degrees to the surface 36. The inner edge portion 58 of member 56 is under static condition interposed between a part of the O-ring and surface 36, and is proportioned whereby it is urged by the slightly indented O-ring against the gate. Thus the flat end face 59 is, under static conditions, continuously urged by the O-ring into contact with the adjacent surface 36 of the gate.

As illustrated particularly in Figure 2, the depth of recess 51 is such that the associated O-ring is normally compressed a slight amount in a direction axially of the passages 11, to thereby have initial sealing engagement with the mounting ring 39 and the gate. Likewise the recess provides a corner space 61 in which the O-ring is squeezed as pressure is applied. It is desirable for this corner to be in pressure equalizing communication with the flow passages through the valve. Thus a small hole 62 is shown drilled from the inner periphery of the mounting ring to the corner 61, and this hole contains a pin or plug 63, which can be flutted or knurled to permit pressure equalizing communication.

The gate 14 is preferably one having a port or flow opening 64 through the same. This opening is adapted to register with the passages 11 for open position of the valve (Figure 1).

Guard plates 66 can be provided for covering the port 64 when the valve gate is in closed position. These plates can be carried by the mounting rings 39 as illustrated.

When the valve gate is in open position it is desirable to have the body space 13 in pressure equalizing communication with the passages 11. For this purpose I provide a small hole 67 in the gate, and which communicates between the port 64 and the space 13.

Figure 6 illustrates the various parts of each mounting assembly 38 and indicates the manner in which the parts are assembled. Assuming that the resilient ring 37 is made of suitable synthetic rubber, it has sufficient resiliency and stretch to be snapped over the lip 54. Ring 56 is dimensioned to readily slide within the peripheral surface 68 of the mounting ring 39, and to be thereby retained concentric with the seal ring under all operating conditions. The guard plate 66 can be made as a separate and detachable part, or if desired it may be permanently secured to the mounting ring 39, as by welding.

For relatively high operating pressures it is desirable to form each surface 49 in a particular manner to prevent or minimize scoring during movement of the gate. Thus the annular portion 49a of each face is relieved a small amount, as for example on an angle (as viewed in section) of about 20′. The relieving (as viewed in section) can commence at an intermediate point 70 and extend inwardly as a slight bevel conforming to the surface of a shallow cone. It is illustrated on an exaggerated scale in Figure 6 to 8. Assuming that the valve is closed and that line pressure is applied to one side of the gate, that portion of the gate extending across the downstream mounting ring is slightly deflected within its elastic limit. Without the relieving just described such deflection would cause the major part of the gate thrust to be carried by the inner edge portion of surface 49, and this would tend to cause scoring upon moving the gate. With relieving such undesirable distribution of the thrust is avoided.

Operation of the valve described above is as follows: Assuming that the gate is in open position as illustrated in Figures 1 and 2 and that the pressure in passages 11 is atmospheric, the O-rings 37 are relaxed to occupy the positions illustrated in Figures 1 and 2, and have sealing contact with both the mounting rings and the adjacent surfaces 36 of the gate. The springs 48 are of sufficient strength to maintain the O-rings slightly compressed, and to cause the metal surfaces 49 of the mounting rings to be pressed against the gate surfaces 36. The two mounting rings 39 assume centralized positions slightly spaced from the associated body portions 42. Assuming now that the valve is connected in a piping system and that fluid line pressure is applied, fluid enters the body space 13 until the pressure therein is equal to the line pressure. Such pressure equalization can take place in part through the vent opening 67, and also some fluid flow can occur past either one or both of the O-rings, as will be presently explained. When fluid pressure is applied to the inner side of an O-ring, under such conditions that the fluid pressure in the body is less than the applied line pressure, the O-ring is stretched a small amount in a radial direction and such stretching causes the O-ring to be somewhat compressed by engagement with the inclined surface 57, with the result that the O-ring is caused to break its sealing contact with the corresponding gate surface 36. In this manner it is possible for pressure in the body to quickly equalize with that of the line.

Assuming now that it is desired to close the valve to shut off the flow, and to hold fluid line pressure applied to the left hand side of the valve as shown in Figure 1, then the hand wheel 32 is turned whereby the gate moves downwardly to bring the port 64 below the mounting assemblies, and to bring the upper solid portion of the gate between the mounting assemblies. Under such conditions the O-ring on the downstream side of the gate (i.e. the right side as viewed in Figure 1) maintains a fluid tight seal between the gate and the corresponding mounting ring 39, and fluid pressure is applied from the body space 13 to the outer side of the downstream O-ring. The application of fluid pressure in this manner tends to distort the O-ring to a certain extent depending upon the amount of pressure applied. By way of example for moderate pressures of the order of 200 p.s.i. the O-ring may be distorted as illustrated in Figure 3. Note that in this figure some squeezing of the O-ring into the corner 61 has occurred. Also the O-ring has retracted somewhat from the lip 58. For higher working pressures of the order of 500 p.s.i. or more, the distortion can be as illustrated in Figure 4. Note that the O-ring is squeezed tightly into the corner 61 and that it is further retracted from the lip 58.

Again assuming that the valve gate is in closed position and that fluid pressure is being applied to say the left hand passage 11 of Figure 1, then the entire gate is urged toward the right and against the right hand mounting ring 39. Ring 39 thus moves a slight amount to bring it into direct abutting engagement with the corresponding body portion 42. This slight amount of movement of the gate and the right hand mounting ring 39 is followed by the left hand mounting ring 39 and its associated O-ring, because of the action of the compression springs 48.

Figure 5 illustrates (with some exaggeration) how the assembly prevents sealing against fluid pressure applied to its inner side. It is assumed in this instance that the differential fluid pressure applied to the inside of the O-ring has been sufficient to press it against the surface 57 of the ring 56. The resulting positioning of the O-ring has caused it to be retracted from sealing engagement with the gate surface 36. Upon removing the differential pressure, either by pressure equalization or otherwise, the O-ring immediately returns to its normal static position illustrated in Figure 2.

Without the opening 67 or a similar vent between the port 64 and the body space 13, it is possible to trap fluid pressure within the space 13 when the gate is open, with a further possibility that the valve may be operated under such conditions to thereby cause discharge of the body pressure into the line. Such reverse past the O-rings is objectionable because it may cause one or both of the O-rings to be dislodged. The opening 67 avoids this possible difficulty, and makes certain that pressure cannot be trapped in the body when the valve is open.

The mounting means for the resilient O-rings described above have a number of advantages, in addition to the fact that they provide means to insure sealing only upon the downstream side of the gate. As previously pointed out, under no-pressure conditions, each ring 56 is yieldably urged against the adjacent surface 36 of the gate by virtue of the resiliency of the O-ring in pressing upon the inner edge 58. The lips 54 and 58 aid in retaining the O-rings within their accommodating recesses when the valve is moved between open and closed positions.

It will be noted that the lip diameter A is somewhat smaller than the diameter of the bore 43, with respect to which each O-ring 44 establishes a seal. Actually the diameter of each bore 43 can be about the same as the mean diameters of the O-rings, when the latter are relaxed. Thus for a 2" valve, bore 43 and diameter A can be 2.832 and 2.607 inches in diameter respectively, with an O-ring 0.210 inch in diameter. With such proportions the pressure areas are such that if under certain conditions, as for example when the valve member is closed, the line pressure is less than body pressure in space 13, the resulting fluid pressure differential tends to urge one or both of the mounting rings 39 away from the gate, thereby preventing a seal with entrapment of body pressure under such conditions. However when the body pressure is equalized with the upstream line pressure, as in normal operation, no fluid forces are developed tending to retract the upstream mounting ring from the gate.

Under normal operating conditions a metal to metal contact is maintained even though the corresponding O-ring should become damaged or displaced. Thus one may continue to use the valve without one or both of the O-rings, with a fair seal being established on the downstream side of the gate between metal to metal surfaces.

The lips 54 together with the curved seating surfaces 53 for the O-rings, greatly facilitate application of relatively high fluid pressures without causing injury or undue wear. Referring for example to Figure 4, it will be noted that the area $a$ of the O-ring which is in sealing contact with the surface 36, is a minor fraction of the total surface area of the O-ring. In a typical instance the radial width of area $a$ of a relaxed O-ring, as measured from the axis of the ring, can be of the order of 10 to 12% of the total ring circumference. Thus with an O-ring having a section diameter of 0.210 inch, the width of the contact area (without applied pressure) upon the surface 36 can be about 0.066 inch. As differential fluid pressure is increased upon the ring, to cause it to be squeezed into the corner 61, the width of the contact area does not change to any material extent, whereby for the same O-ring the width of the contact area can be of the order of 0.078 inch for differential fluid pressures of 500 p.s.i. or more. This is contrary to conventional O-ring practice where rectangular shaped recesses are employed to accommodate the O-rings. With such a simple recess an increase in applied differential pressure results in a relatively large increase in the width of the contact area.

A further advantage resulting from the manner in which the O-rings are supported and retained is that severe surface stressing effects of the O-ring, such as tend to cause undue wear when the valve is moved between open and closed positions, are minimized. Thus with the present invention wear upon the O-ring is reduced to a minimum, although the permissible operating pressure may be increased beyond conventional O-ring practice.

As previously explained, application of line pressure to one side of the gate in closed position forces the gate against the surface 49. Such thrust is adequately distributed over the surface 49 (and surface portion 49a) irrespective of some deflection of the gate under high operating pressures, thereby preventing or minimizing scoring in the manner previously described.

In the foregoing it is assumed that the O-rings are formed of synthethic rubber, such as Hycar or neoprene, which permits a fair amount of give and stretch. Figure 7 illustrates another embodiment of the invention which is suitable for use with O-rings made of material like nylon or Teflon which do not permit stretching to the extent sufficient to snap over the lips 54. Thus in this instance the lips 54 are formed upon the separate rings 71, which are slidably fitted within the mounting rings 39. When it is desired to replace an O-ring, it is a simple matter to remove the ring 71, after which the O-ring can be removed and replaced as desired.

Figure 8 illustrates another embodiment in which two separate insert rings are employed. The recess 51a in this instance is formed entirely in the mounting ring 39, and the inner defining surface 72 conforms to a cylinder. The bottom rear surface 52a corresponds to surface 52 of Figures 1 to 6. The metal insert ring 73 is loosely fitted upon surface 72 and is provided with a curved surface 53a and a lip 54a, corresponding to surface and lip 53 and 54 of Figures 1 to 6. The bottom corner 61a of the recess is in pressure equalizing communication with the adjacent passage 11 through the clearances between surfaces 52a and 72, and the adjacent end and peripheral surfaces of the ring 73. Ring 73 can be formed of suitable metal like that employed for ring 56. The major part of the surface 49 is relieved in the manner previously described.

In general Figure 8 operates in the same manner as Figures 1 to 7. Under no-pressure conditions, the O-ring urges both rings 56 and 73 against the gate. When a pressure differential is applied about the O-ring it is urged against surface 53a in the manner previously described and this provides a force component tending to urge ring 73 more tightly against the gate. Thus under all conditions metal to metal surfaces are provided in proximity with the O-ring, and these surfaces have a scraping action to minimize introduction of grit or other foreign particles between the contacting gate—O-ring surfaces. Another feature of Figure 8 is that pressure equalization of the recess with the downstream passage is accomplished without a vent through ring 38 and therefore a more effective seal is provided between the metal ring 39 and the gate, if the O-ring should be mutilated or removed. In addition to the foregoing advantages the arrangement of Figure 8 is less expensive to manufacture than the constructions of Figures 1 to 7.

Reference is made to my copending applications 3,728 filed January 22, 1948 (now Patent 2,713,989); 100,225 filed June 20, 1949 (now abandoned); and 271,037 filed February 11, 1952, now Patent No. 2,810,542.

I claim:

1. In a gate valve construction, a body providing flow passages and a space between the passages, a flat gate disposed within the body and moveable in said space transversely of the flow passages between open and closed positions, a resilient seal ring of the O-ring type disposed adjacent one side of the gate and embracing the associated body passage, said seal ring being disposed whereby one side of the same contacts and seals with respect to the adjacent face of the gate, annular mounting means carried by the body and serving to mount said seal ring, said mounting means having an annular recess for loosely accommodating said seal ring, said recess in section being defined by a bottom surface that is spaced from and parallel to the corresponding side face of the gate and also by inner and outer concentric surfaces extending about the inner and outer peripheral surfaces of the seal ring, the seal ring being dimensioned whereby it is normally compressed between the adjacent face of the gate and said bottom surface, and a relatively rigid insert ring loosely disposed in said recess between one peripheral surface of the seal ring and the corresponding one of said concentric surfaces, said insert ring being of less axial dimension than a side of said recess whereby said insert ring is movable within the recess into engagement with the gate, said insert ring having a seal ring engaging lip adjacent said gate, said lip engaging and being urged by said seal ring to press the insert ring into contact with the gate.

2. A valve as in claim 1 in which the insert ring extends circumferentially about the outer periphery of the resilient seal ring.

3. A valve as in claim 1 in which the insert ring extends about the inner peripheral surface of the seal ring.

4. A valve as in claim 1 in which two of said insert rings are provided, one being disposed to extend circumferentially about the outer periphery of the seal ring and the other being disposed to be embraced by the seal ring.

5. In a valve construction, a body providing aligned flow passages and a space between said passages, a flat gate disposed within said space and movable transversely of the flow passages between open and closed positions, a pair of resilient seal rings of the O-ring type disposed on opposite parallel side surfaces of the gate, a pair of mounting means for each of said seal rings, said mounting means being carried by the body and formed to provide annular recesses for loosely accommodating the seal rings, whereby the seal rings embrace the inlet and downstream passages when the gate is in closed position, both of said seal rings serving to seal against fluid pressure in the body, and means serving to effect a breaking of sealing engagement between a seal ring and the adjacent side surface of the gate responsive to application of a pressure differential to the inner peripheral surface of the seal ring, said means comprising a rigid ring extending circumferentially about the outer periphery of the corresponding seal ring and urged against the adjacent face of the gate by the resiliency of the seal ring, each of said rigid rings providing an inclined face against which the seal ring is caused to press when the seal ring is urged outwardly by pressure applied to the inner side of the same, whereby the seal ring is caused to break its sealing contact with the gate.

6. A valve as in claim 5 in which the gate is provided with a port through the same adapted to register with said passages for open position of the valve, and in which the space within the body surrounding the gate, when the gate is in open position, is vented to said port.

7. A valve as in claim 5 together with a second pair of rigid rings extending about the inner peripheries of the seal rings and loosely inserted into said recess, each of said latter rings providing a curved surface for seating the associated seal ring when pressure is applied to the outer side of the same, said second rings being urged into contact with the side surfaces of the gate by the associated seal ring.

References Cited in the file of this patent

UNITED STATES PATENTS

| | | |
|---|---|---|
| 2,030,458 | McKellar | Feb. 11, 1936 |
| 2,510,442 | Volpin | June 6, 1950 |
| 2,594,173 | Jensen | Apr. 22, 1952 |
| 2,606,740 | Allen | Aug. 12, 1952 |
| 2,621,885 | Schmitt | Dec. 16, 1952 |
| 2,674,436 | Jones | Apr. 6, 1954 |
| 2,676,782 | Bostock | Apr. 27, 1954 |

OTHER REFERENCES

Product Engineering, vol. 16, February 1945, pp. 100–104 (TJ–1–.P93), published by McGraw-Hill Publishing Co., Inc., 330 W. 42nd St., New York 18, N.Y. (Copy in scientific library.)